April 25, 1939.　　P. T. FARNSWORTH ET AL　　2,155,478
MEANS FOR PRODUCING INCANDESCENT IMAGES
Filed May 7, 1935　　　3 Sheets-Sheet 1
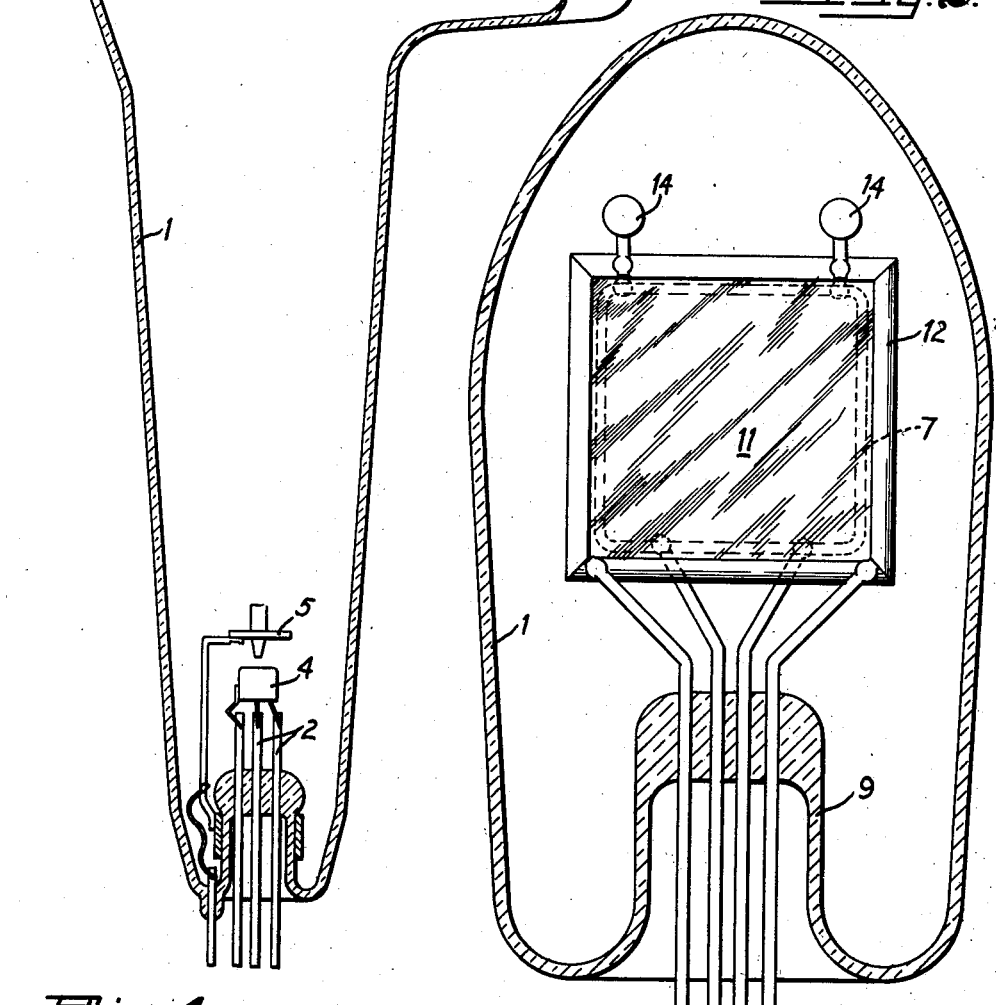
PHILO T. FARNSWORTH.
HARRY S. BAMFORD.
　　　INVENTORS.

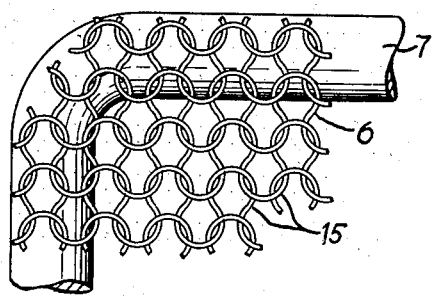
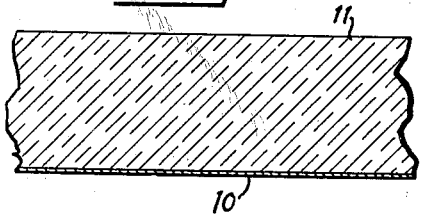
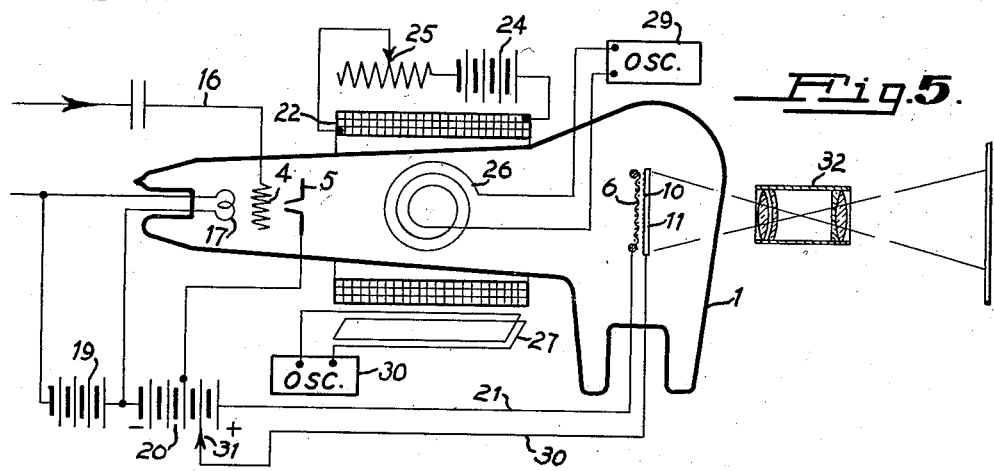
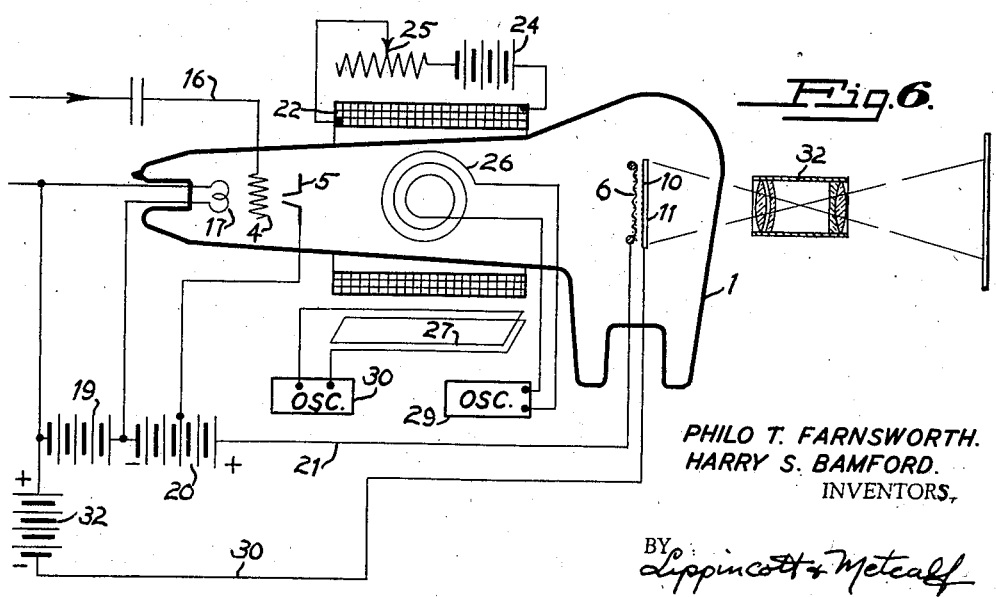
PHILO T. FARNSWORTH.
HARRY S. BAMFORD.
INVENTORS.

April 25, 1939. P. T. FARNSWORTH ET AL 2,155,478
MEANS FOR PRODUCING INCANDESCENT IMAGES
Filed May 7, 1935   3 Sheets-Sheet 3
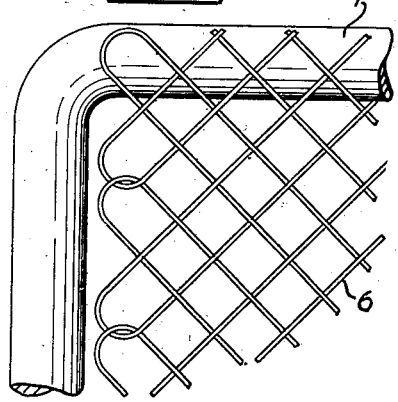
Fig. 8.
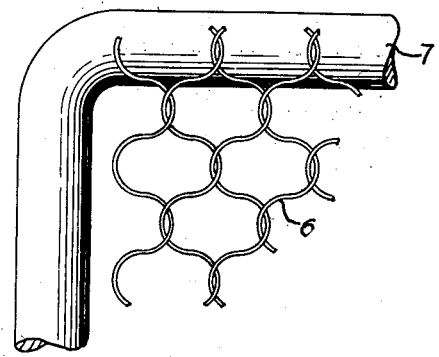
Fig. 9.
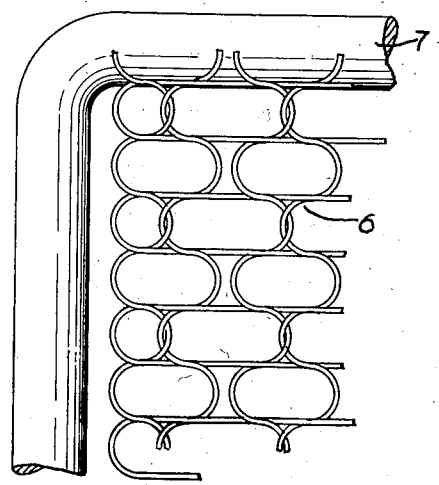
Fig. 10.
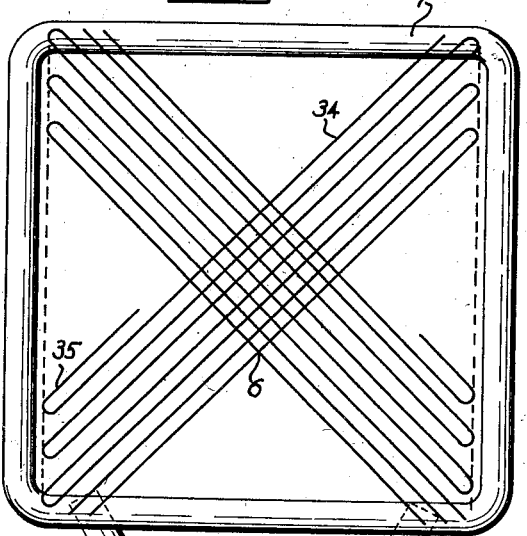
Fig. 7.
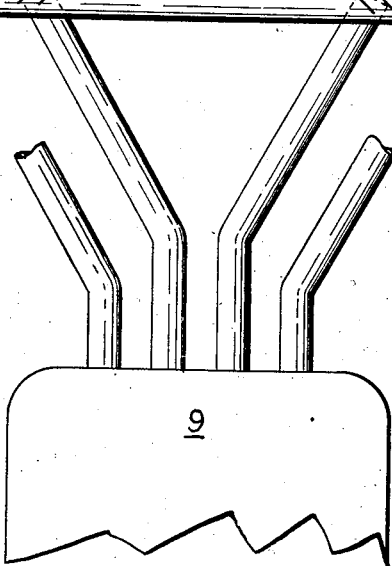
PHILO T. FARNSWORTH.
HARRY S. BAMFORD.
INVENTORS.
BY Lippincott & Metcalf
ATTORNEYS.

Patented Apr. 25, 1939

2,155,478

UNITED STATES PATENT OFFICE 2,155,478

MEANS FOR PRODUCING INCANDESCENT IMAGES

Philo T. Farnsworth, San Francisco, Calif., and Harry S. Bamford, Philadelphia, Pa., assignors, by mesne assignments, to Farnsworth Television & Radio Corporation, Dover, Del., a corporation of Delaware Application May 7, 1935, Serial No. 20,159

3 Claims. (Cl. 250—164)

Our invention relates to an incandescent light source in the form of a fabric screen adapted to be raised to incandescence by electron bombardment, preferably within the cathode ray tube.

Among the objects of our invention are: To provide a method of operating a cathode ray tube; to provide a means and method of producing an incandescent image; to provide a cathode ray tube which when energized will produce an incandescent image of sufficient brilliance to be used as a light source for image projection through an optical system external of the tube itself; to provide a means and method for bombarding a cathode ray screen with electrons from both sides thereof; to provide a means and method for operating a cathode ray tube whereby an incandescent image is produced on an inherently elastic fabric made from relatively inelastic refractory wire filaments; to provide a means and method of operating a cathode ray tube having an apertured luminescent screen; to provide a means and method for utilizing electrons passing through an apertured cathode ray screen; to provide means and method for efficiently utilizing the power of a cathode ray beam to produce incandescence in a cathode ray tube screen; to provide a means and method for incandescing a refractory material by the use of high velocity electrons by reducing heat conductivity within the screen; to provide a means and method for producing an incandescent image in a cathode ray tube; and to provide a cathode ray tube having ideal characteristics for television use or other uses where an extremely brilliant image is desired.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

Referring to the drawings:

Figure 1 is a longitudinal view, mostly in section, of a preferred embodiment of a cathode ray tube employing our present invention.

Figure 2 is a cross sectional view, partly in elevation as seen from the viewing end of the tube of Figure 1 and taken as indicated by the line 2—2 of Figure 1.

Figure 3 is an enlarged detail plan view of a portion of the mounting and screen as shown in Figures 1 and 2, wherein the fabric is knitted from refractory wire.

Figure 4 is a cross sectional view of the transparent backing plate which may be used in conjunction with the cathode ray tube screen of our invention.

Figure 5 is a diagrammatic circuit showing one way in which the screen of our invention may be bombarded with electrons from both sides thereof.

Figure 6 is another circuit diagram reduced to lowest terms, showing another way in which the screen may be bombarded from both sides, utilizing secondary electrons.

Figure 7 is a plan view of a biased fabric screen supported solely by two opposite edges.

Figure 8 is a small detail view of the screen shown in Figure 7.

Figure 9 is a detail view of a net fabric screen.

Figure 10 is a detail view of a gauze or leno fabric screen.

It should be understood that Figures 3, 7, 8, 9 and 10 are not drawn fully to scale, but are somewhat diagrammatic due to the complexity and small mesh size of the fabric in its actual size.

The present invention differs from most prior art cathode ray tubes in that the light given off upon bombardment of the screen or target by a beam of cathode rays is due to incandescence or actual heating of the screen material, and not by virtue of any phosphorescence or fluorescence of the screen material. In the latter case, the light is, within limits, entirely independent of the heat developed by impact.

In Farnsworth application, Serial No. 655,784, filed February 8, 1933, entitled Luminescent screen and method of use, there is disclosed and claimed a novel heat screen for a cathode ray tube wherein the screen material is either a fabric or an exceptionally thin refractory sheet positioned to be raised to an incandescent heat by electron impact, and it is also pointed out therein that the main desideratum in such a heat screen is the prevention of conduction of heat in the screen, and that when heat losses can be limited as far as possible to radiation alone, the bombarded spot becomes more brilliant and the heat thereof will be confined closer to the size of the area actually impacted by the electron beam.

The present application presents a more complete solution to the problem as the heat losses are more closely limited to radiation than in the former invention, and in addition, other problems involved, due to the fact that practical refractory materials expand and contract considerably during heat accumulation, cause breakage within the body of the screen, are likewise solved. Furthermore, the present invention presents a screen which has far less mass than former screens and therefore maximum brilliancy is attained with a decreased power consumption.

The present invention, therefore, comprises broadly in terms of apparatus, a means for producing a beam of electrons such as an electron gun, and a screen positioned to intercept the electrons in the beam, the latter comprising an open mesh inherently elastic fabric formed from relatively inelastic refractory wires such as tungsten or tantalum, for example. We prefer to utilize an exceptionally fine wire such as one having a diameter of .001 inch, or less, and a final fabric which has a mesh greater per unit area than the number of elements desired to make up an image within that unit area.

The words "inherently elastic" as used in this specification include any and all fabrics built up from relatively inelastic filaments and characterized by having, when mounted, all the filaments in at least one dimension substantially longer than the shortest distance between their fixed termini, thus forming elastic loops at some portion of their path along their course in order that contraction and expansion may take place without breakage of the filaments. The term will, therefore, be generic to any such type of fabric whether woven, such as net, gauze, double gauze, semi-gauze or leno; or formed by looping a filament on itself as in knitting or crocheting or similar fabrication; or in any other manner known in the art to produce such an inherently elastic fabric from relatively inelastic filaments.

While we prefer the fabrics which are inherently elastic through all major dimensions, our invention is fully operable within the scope of the appended claims when elastic in one major dimension alone, as will be pointed out later. The term shall also be deemed to include warp and woof fabrics cut on the bias, thereby being capable of being mounted by two opposite edges without direct fixation of both ends of a loopless filament, or both ends of a straight run filament.

Our invention in broad terms of method includes the method of making a cathode ray screen from refractory materials so that it will be inherently elastic in at least one major dimension whereby it can be mounted by at least two opposing edges so that contraction and expansion may take place within the screen as the electron beam passes thereover, preferably successively over elementary areas thereof to produce an image larger than the cross section of the beam, and it also provides for directing electrons against the screen in two directions in order that the screen be made efficient even though electrons pass therethrough due to open mesh construction.

We do not, however, wish to be limited in any way in our invention to the bombardment of the screen from both sides, since this portion of our invention is directed solely towards increasing the efficiency of light production from the screen and in no way affects the fundamental action of the screen in its response to electron bombardment. If the screen is inherently elastic in all major dimensions, it may be mounted by all its edges without further backing or, if it is inherently elastic in one major dimension only it may be mounted by edges at right angles to that major dimension, the other major dimensions being unsupported.

Due to the fact that we prefer to use an open mesh screen, it will be apparent that when the screen is bombarded from one side by electrons, only a certain proportion of those electrons will be intercepted by the screen, other electrons passing through the screen. We, therefore, prefer in the interest of efficiency, to either return the electrons which pass therethrough back to the screen or to allow the electrons passing therethrough to bombard a surface adapted to be secondarily emissive and to return the secondaries thus produced to the screen to aid in the heating thereof. In case we desire to utilize such an electron controlling electrode back of the screen, we prefer to mount the screen on a transparent material such as glass or quartz and make the electrode in the form of a thin transparent film which closely approaches the side of the screen away from the electron source, but which does not at any point touch it. The electron-controlling film, being transparent and being mounted on a transparent support does not greatly interfere with the passage of light therethrough and the image may therefore be placed in the focus of an optical system without the tube and the light from the screen passed directly through the film and its support to be focused on an external screen for viewing. Due to the fact that the incandescent image formed on the screen is exceedingly brilliant, large projected images may be formed with great brilliancy therein.

It is believed that further broad aspects of our invention may be more readily understood by a consideration of the drawings and in Figures 1 and 2 we have shown a preferred embodiment of screen as mounted, together with an electron-controlling element in a cathode ray tube envelope 1. The small end of the envelope is preferably provided with an electron gun which comprises a source of electrons preferably a filament supported on filament leads 2, the actual heated portion of the cathode not being shown because it is covered by a cup-shaped grid electrode 4 having an aperture, not shown, in its bottom surface through which electrons may pass to enter an aperture in an accelerating anode 5, positioned adjacent thereto. The gun shown is purely conventional and any such anode-cathode combination is satisfactory, or other means known in the art to produce an electron beam are deemed full equivalents.

The cooperation of the cathode and the anode 5 causes a stream of electrons to be emitted with high velocity from the anode 5 towards the far end of the tube. This beam is controllable as to intensity by means of the grid 4, as will be later pointed out when the hook-up of the tube is being discussed. Electrons are accelerated towards the far end of the tube in which is positioned an open mesh fabric heat screen 6 mounted on a preferably rectangular frame 7 and supported by side stem 9.

In certain cases, this structure is sufficient to reduce our invention to practice, but as we use an open mesh screen and therefore electrons from the electron gun are bound to pass therethrough, we prefer to provide additional means for utilizing such electrons to aid in the heating of the screen. This means preferably comprises a backing electrode 10 such as a thin transparent film of nickel preferably sputtered onto a glass or similarly transparent plate 11, the plate 11 being mounted in a circumferential frame 12, supported also on stem 9, the plate and film being positioned so that the film is closely adjacent to but not touching the screen 6 and also parallel to the extent thereof. In order to maintain the relative positions of the film and the screen, we prefer to tie the two together opposite the stem by a glass bead 14.

The preferred detail embodiment of a preferred screen fabric is shown in Figure 3. Here the frame 7 has welded to it on all edges the fabric screen 6. The screen in this case is preferably formed from tungsten wire of .001 inch or less, and in this case knitted, thus forming loops 15. This type of fabric is obviously elastic in all directions, the loops allowing contraction and expansion of the individual filaments when heated at any point throughout the extent of the screen and no direct pull can be obtained between fixed portions of the screen, thus effectively preventing all breakage during bombardment. It is believed that an explanation of the action of the tube will be in order before passing on to modifications which may be used in the structure of the screen itself.

One way of operating the screen is shown in Figure 5. Here the cathode ray tube 1 with its cooperating screen and backing film 10 is connected in an electrical circuit such as a television receiver, whereby the grid 4 is supplied with signals of varying intensity such as those produced by scanning a picture to produce television signals, through input wire 16. The cathode 17 is energized by a cathode source 19 and heated to emit electrons. The apertured anode 5 is energized to a positive potential by an anode source 20 and the screen 6 is maintained at a potential more positive than the anode 5 from the same source through wire 21. If the screen is to be used without taking into account electrons passing therethrough, the film 10 and its supporting plate is left out of the tube.

Electrons emitted from cathode 17 and accelerated by anode 5 pass therethrough and impact screen 6 with such velocity that those which are intercepted thereby raise the individual filaments of the screen within the area of the spot to incandescence. In order to keep the spot as small as possible, we prefer to utilize a focusing coil 22 around some portion of the beam in order to provide a magnetic field tending to keep the spot from diverging, and to focus the electrons in the plane of the screen 6. The current through this coil is supplied by focusing source 24 and under the control of the variable resistor 25.

The beam is then influenced to move in two directions by the magnetic field of scanning coils 26 and 27 which are preferably supplied with a saw-tooth scanning current by their respective oscillators 29 and 30. Thus, the small spot is made to pass over successive elementary areas of screen 6, heating them to incandescence or to a brilliancy as determined by the modulation of the beam by signals entering through input leads 16 onto the grid 4. There will thus be produced on the screen 6 an incandescent image which will be a reproduction of the picture which is being scanned at the transmitter, providing of course, there is scanning synchronization, as is well known in the art.

It will be apparent that as the spot passes over the screen 6 with particular reference to the screen shown in Figure 3, that in order to produce an image of such detail to bring out all the detail that is inherent in the incoming signal, that the mesh of the screen 6 should be at least as great as the number of elements in the signal under scansion. Therefore, if the 200 line picture is to be reproduced with 200 elements to the line, there should be at least 200 meshes to the line and preferably more. It, also, should be pointed out that in order to prevent conduction that the mass of the wires should be as small as possible and for this reason we prefer to form the fabric of the refractory wires such as tungsten which are fabricated in as small diameter as can be handled in the weaving or knitting thereof. We have found that it is quite practical to weave or knit fabric of wire which is between .0005 inch and .001 inch, but we also prefer to still further decrease the diameter of these wires by etching, after fabrication, and we accomplish this by knitting or otherwise forming the fabric of wire of the sizes mention, mounting it by spot welding it, for example, to the frame 7 and then cleaning it and immersing the entire screen in an etching fluid to uniformly reduce the diameters of the wire. We have found that it is possible to knit a screen of .001 inch tungsten wire, for example, mount it, clean it and immerse it in hot solution of sodium nitrite and thus etch it to .00025 inch. When this is done, we find that the screen becomes practically invisible when cold and highly efficient. Heat losses by condition are practically negligible and the losses are almost wholly pure radiation.

Inasmuch, however, that when the fabric is made of such small wire, and even though the meshes thereof are on the order of from 50 to 300 to the inch, the fabric is in reality of relatively open mesh, and therefore, when it is bombarded by the electron beam, a great number of the electrons do not hit the screen but pass directly therethrough. In order to increase the efficiency of the device we prefer to utilize those electrons which pass through the screen in order to still further raise the temperature of the screen. We do this by the proper energization of the film 10 immediately back of the screen.

There are several methods of energizing this film to cause electrons initiated by the source to bombard the side of the screen away from the electron gun. One of these methods is shown in Figure 5. Here the film 10, in this case may be a sputtered film of nickel. In this regard we have found that nickel films can be deposited on a glass or quartz or similar transparent plate to be fully conductive and yet at the same time have a light transmission of from 80 to 90 per cent. In this case, the film 10 is made slightly negative to the screen 6 by attaching lead 30 from the film 10 to the anode source at a point 31 intermediate the anode 5 and the screen 6. When so energized, electrons passing through screen 6 impact the film 10 with sufficient velocity to create secondary electrons, and as the film 10 is negative to the screen 6, these secondaries will be pulled back to the screen and will aid in the production of heat therein. We have found that if the screen 6, in a specific tube, for example, is made about 75 volts negative to the film 10, secondary electrons will be created by the primaries passing through the screen and will impact the screen 6 with sufficient velocity to aid the intercepted primaries in the heating of the screen. Since the source of these secondaries is very close to the screen a large fraction of them will be picked up thereby and a large increase in efficiency obtained.

Other films more secondarily emissive than nickel may be used but as nickel has the ability to supply up to 1.64 secondary electrons when properly bombarded by one primary, it can be seen that a large increase in efficiency will be obtained.

Another way of utilizing the electrons passing through the screen is shown in Figure 6 wherein all connections are the same as in Figure 5 with the exception that the film 10 is connected to the cathode with a source of negative potential 32 in series with the lead 30 so that the film 10 is highly negative to the screen. In this case, the electrons passing through the screen cannot hit the film 10, but are reversed in direction and are returned to the screen. While we prefer to utilize the secondary emissive feature as shown in Figure 5, as it increases the efficiency slightly more than the arrangement shown in Figure 6, we find that both methods utilizing the electrons passing through the screen or derivatives thereof, to heat the back side of the screen greatly increase the efficiency of the device.

By using open mesh screens of fine material, we have reduced power consumption from the 75 to 100 watts formerly required by the above referred to screen of Farnsworth, to 10 or 15 watts, and thus an extremely brilliant and efficient image is produced of such intensity that it may be used as a projection source.

In case it is desired to project such image, and it usually is, because the extreme brilliancy attained is usually too great to allow the image to be viewed directly by the eye, a projection lens system 32 is positioned in front of the tube in such a manner that the light from the screen 6 passes through the transparent film 10, through the film support plate 11, and through the wall of the tube 1, and thence into the projection lens.

It has been found that in spite of the fact that there is interposed between the lens and the incandescent screen, the film and the plate, the light obtained from the tube is far greater than that obtainable in any prior art device. It is of course to be understood that when no use is made of the electrons passing through the screen there will be no film or plate present in the light path, and light from the screen 6 will merely have to pass through the wall of the envelope in order to reach the projection lens. While it is perfectly possible to place the screen 6 on an angle to the beam from anode 5 in order that the projection lens be able to pick up light directly from the front face of the screen, we do not favor this latter arrangement because of the fact that "keystoning" or distortion of the image area occurs. With a screen of the type described, as the entire volume of the wires or filaments composing the fabric is incandesced, there is no reason why the image should not be picked up from the side of the screen opposite from the electron gun, the only difference in the light intensity being a slight reduction of intensity due to the film 10 and its support, when used. As, however, this film may have from 80 to 90 per cent light transmission and as the square positioning of the screen with respect to the gun and beam eliminates distortion, the position as shown is much to be preferred.

While we have shown in Figure 3 a preferred form of fabric which is adapted to be supported on all of its edges and solely by its edges, and still be elastic throughout, our invention includes other fabrics which are inherently elastic and which may be mounted so that no breakage of the filaments will occur during scansion, by the electron beam, with consequent incandescence. In Figure 7 a refractory fabric is shown having a bias and it is so mounted in the frame 7 that only the upper and lower edges of the fabric are attached to the frame 7. The representation is somewhat diagrammatic as our entire fabric in a preferred structure covers an area two inches square, but it will be seen from the diagrammatic representation that wire 34 which is firmly fixed to the upper bar of the frame 7 does not reach the lower bar of the frame 7 but turns in a selvage loop 35 and returns to be fixed to the upper bar again. If the longitudinal dimension of this bias woven fabric is made such that there will be no straight runs included between the upper and lower bars then it will be apparent that the fabric will be perfectly elastic as far as internal contractions and expansions are concerned so long as the two opposing edges are free.

The attachment of the cut edge of the bias woven material is shown in Figure 8. It is also of course to be understood that bias woven material of this sort need not be mounted on the frame with a selvage edge as the free edge. A fabric may be cut and mounted on the bias and mounted so that there are two fixed and two free edges. While there might be some possibility in this case of unraveling along the free edges, there are a number of methods easily discernible to those in the art, for preventing such raveling, such as turning the edges or similar procedures. In any case, all that is necessary is that there shall be no straight runs fixed to both upper and lower supports or any opposite supports whereby solid resistance to contraction and/or expansion might tend to break the individual filaments of the fabric.

In Figure 9 a net fabric is shown and while the figure shows only a single looped net, it is quite obvious that double and triple loops, which are common in the art, may be used. A net of this sort is elastic in any direction as long as the edges in a direction at right angles to the first direction are not fixed. Therefore, in this case, we also prefer to leave opposite edges unsecured and preferably the unsecured edges should be selvage edges. It is also obvious that with nets of this sort, they should not be mounted on the frame in such a way that the junctions of the loops form a straight run between the upper and lower fixation points of the fabric. While here there would not be a direct straight run of a single filament, there would be the equivalent in that there would be a straight run with the strains being directly transmitted through alternate filaments.

Figure 10 shows a fabric made of a gauze or leno weave wherein the filaments in one direction are straight runs, whereas the filaments running in the opposite direction are looped. It is obvious in this case only the looped threads should be fixed to the supports, leaving the straight runs unsecured at both ends. In this case, also, the free edges may be made selvage edges and we have found that in all cases where there are straight runs unsecured at both ends, that there is sufficient slippage of the filaments in the straight runs over the loops of the looped filaments so that no solid strains can be set up of sufficient magnitude to cause breakage within the fabric.

It should be pointed out in respect to the use of fabric screens as have been here above described, that the problem is not essentially that of an overall expansion or contraction. The real problem is the local expansion and contraction which takes place when the electrons in the spot impact the fabric. An overall expansion will simply bow the entire fabric to some extent, but as the fabric is of so little mass, and radiates its heat so quickly, we have found that only five to ten per cent of the screen will be hot at any one time. For that reason there is no appreciable distortion of the screen out of the original mounting plane and therefore the backing plate, when used, together with its surface film 10 may be placed exceptionally close to the screen.

While it may appear that the actual production of such a fine mesh screen of fine wires is virtually impossible, we have found that such is not the case. Tungsten wire of from .0005 to .001 inch can be obtained in a highly annealed condition and we have been able to make screens by hand and by machinery which have a sufficient number of meshes to satisfy the most exacting high fidelity television requirements.

Furthermore, we have succeeded in reducing the original diameter of the tungsten wire by more than one-half so that we have produced in practice screens having an actual uniform filament diameter of less than .00025 inch. Such screens when cold are virtually invisible to the naked eye but become highly incandescent upon bombardment. There is also no trouble in welding the edges of the fabric to the frame as tungsten wire of this size welds easily to nickel.

We claim:

1. Means for producing a visual image comprising an envelope containing means for producing a cathode ray beam, an open mesh fabric screen, means for directing said beam over successive elemental areas of said screen to produce an incandescent image thereon by the impact of electrons intercepted thereby, and transparent means for returning beam electrons to said screen that pass therethrough, said transparent means being positioned between said screen and an observer viewing said screen.

2. Means for producing a visual image comprising an envelope containing means for producing a cathode ray beam, an open mesh fabric screen, means for directing said beam over successive elemental areas of said screen to produce an incandescent image thereon by the impact of electrons intercepted thereby, a second imperforate electrode closely adjacent the back side of said screen adapted to be energized to return beam electrons passing through said screen to said screen, said second imperforate electrode being transparent to allow viewing of the produced image therethrough.

3. Means for producing a visual image comprising an envelope containing means for producing a cathode ray beam, an open mesh fabric screen, means for directing said beam over successive elemental areas of said screen to produce an incandescent image thereon by the impact of electrons intercepted thereby, a transparent plate positioned back of said screen parallel thereto and spaced therefrom only a sufficient distance to clear said screen when heated, and a transparent conductive film on said plate.

PHILO T. FARNSWORTH.
HARRY S. BAMFORD.